United States Patent Office 3,414,543
Patented Dec. 3, 1968

3,414,543
HETEROCYCLIC POLYMERS PREPARED FROM THE REACTION OF TETRACARBOXYLIC ACID DIANHYDRIDES AND TETRAMINES
Robert Michael Paufler, Olympia Fields, Ill., assignor to E. I. du Pont de Nemours and Company, Wilmington, Del., a corporation of Delaware
No Drawing. Continuation-in-part of application Ser. No. 427,129, Jan. 21, 1965. This application May 19, 1967, Ser. No. 639,603
15 Claims. (Cl. 260—47)

ABSTRACT OF THE DISCLOSURE

A shapeable linear amino polyamide acid and the corresponding polyheterocyclic compound to which it is converted by heating. The process of preparing the above polymers by reacting a tetraamine and a tetracarboxylic acid dianhydride.

---

This application is a continuation-in-part of my copending application Ser. No. 427,129, filed Jan. 21, 1965, and now abandoned, which is a continuation-in-part of my copending application Ser. No. 338,569, filed Jan. 20, 1964, and now abandoned.

This invention relates to novel, shapeable or tractable polymeric compositions and, more particularly, to the preparation of the tractable polymeric compositions, their formation into shaped articles, and their conversion into substantially intractable polymeric articles. As used in the present specification, shapeable refers to the ability of the polymeric compositions as gels or solutions to be shaped into useful structures by extrusion through dies, casting as films, coating on substrates, or by similar processing.

The outstanding physical and chemical properties of certain polymers make them extremely useful in the form of shaped structures such as films, filaments, tubing, etc. However, the same outstanding physical and chemical properties make it extremely difficult to shape the polymers into useful structures. One purpose of the present invention is to provide a group of polymeric compositions having satisfactory physical and chemical properties, but which can easily be formed into shaped structures. A further purpose is to select polymeric compositions which, in the form of shaped structures, can be converted into polymers having even more outstanding physical and chemical properties.

Specifically, the object of the present invention is to provide shapeable compositions of certain linear amino polyamide acids, generally mixed with the corresponding amino polyimides.

A further object of this invention is to provide shaped structures of theese polyamide compositions.

A still further object of the invention is to convert the linear amino polyamide acid structures to structures of polymers having even more desirable properties than the linear amino polyamide acids, e.g. structures of polyheterocyclics to be more fully described hereinafter. These and other objects will appear hereinafter.

The objects of the invention are accomplished by a composition containing at least one linear amino polyamide acid having the following structural formula:

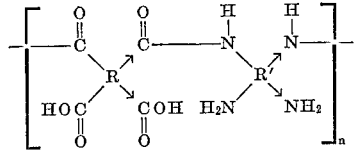

R is a tetravalent radical containing at least two carbon atoms, substituted with carbon atoms in pairs, the members of each pair being situated 1,2 or 1,3 on carbon atoms of the R group, and ortho or peri when R is aromatic;

R' is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals;

→ denotes isomerism; and $n$ is an integer sufficient to provide a film-forming linear amino polyamide acid, i.e., having an inherent viscosity of at least 0.1, preferably 0.5 to 5.0, as measured at 30° C. as a 0.5% by weight solution in a suitable solvent, such as dimethyl sulfoxide or N,N-dimethylacetamide.

The process for preparing the linear amino polyamide acid compositions comprises reacting by mixing at least one organic tetra-amine having the structural formula:

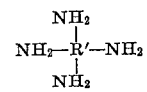

wherein R' is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, each amino group of said tetra-amine attached directly to a carbon atom of a ring of said tetravalent radicals ortho or peri to the carbon atom to which another amine group is directly attached;

with at least one tetracarboxylic acid dianhydride having the structural formula:

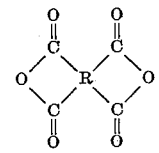

wherein R is a tetravalent radical containing at least two carbon atoms, substituted with carbon atoms in pairs, the members of each pair being situated 1,2 or 1,3 on carbon atoms of the R group, and ortho or peri when R is aromatic;

in an organic solvent for at least one of the reactants, the solvent being inert to the reactants, preferably under anhydrous conditions, for a time and at a temperature below 125° C. (generally below 100° C.) sufficient to provide the corresponding linear amino polyamide acid and amino polyimide without gelation. The tetra-amine and dianhydride are reacted in substantially equimolar quantities.

The terms ortho and peri in the context of this patent, as applied to the location of the amino functional groups in the fully ring hydrogenated tetra-amines, is meant to designate those carbon atoms which are in the ortho and peri relation in the corresponding aromatic ring system.

It should be understood that one purpose of the process is to provide a composition that can be shaped into useful objects. In determining a specific time and a specific temperature for forming the linear amino polyamide acid of a specified tetra-amine and a specified dianhydride, several factors must be considered. The maximum permissible temperature will depend on the tetra-amine used, the dianhydride used, the particular solvent, the percentage of linear amino polyamide acid desired in the final composition and the minimum period of time that one desires for the reaction. Temperatures up to 125° C. may be tolerated to provide shapeable compositions of the linear amino polyamide acid. The particular temperature below 125° C. that must not be exceeded for any particular combination of tetra-amine, dianhydride, solvent and reaction time to provide a reaction product composed of a shapeable linear amino polyamide acid will vary but can be determined by a simple test by any person of ordinary skill in the art.

The resulting linear amino polyamide acid can be cast or extruded into a film, filament, rod, tube or other desired shape, or it can be used in solution as a coating composition. After shaping the composition composed predominantly of the linear amino polyamide acid, preferably still in the solvent, into a useful article, e.g., filament, film, tube, rod, etc., and drying the article, it is preferred to convert the linear amino polyamide acid to another polymer to modify the properties of the shaped structure. Thus, the linear amino polyamide acid is converted to the corresponding polyheterocyclic by treatment to split out the elements of water, i.e., by heating at a temperature of at least 150° C., preferably 200° C. to 400° C. for a sufficient time, usually at least one hour, to effect such conversion to the fused heterocyclic ring systems.

The polyheterocyclics of this invention find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors, they can be processed into shaped articles such as films, fibers, tubes, rods, sheets and disc by conventional techniques, and then converted into the final high-melting relatively intractable cyclized polymers, the polyheterocyclics more fully described hereinafter.

The final shaped article may consist of the heterocyclic polymer alone or as a blend with other polymers and/or modified with inert materials. Depending on their nature, the inert materials can be added before or after shaping. For example, fillers such as pigments, electrically conductive carbon black and metal particles, abrasives, dielectrics and lubricating polymers can be added conveniently to the intermediate linear amino polyamide acid as such or to a solution of the intermediate polymer before shaping. Certain abrasives and electrically conductive materials are better added as surface layers. A cellular form or foam of the final polymer can be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, can be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.), polyesters (polyethylene terephthalate, etc.), polyamides, polyimides, perfluoro carbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed by the polymer of this invention can be used wherever films have heretofore been used. They serve advantageously in wrapping, packaging and bundling applications. Additionally, the film-forming polymer can be used in automobile and aviation interior headlining materials, decorative trim, high temperature electrical insulation, in the form of corrosion-resistant pipe, duct work, containers and container linings, and the laminating structures mentioned previously. In fiber form, the polymer of the present invention offers possibilities for high temperature electrical insulation, protective clothing and curtains, filtration media, packing and gasketing materials, brake linings and clutch facings.

In the preparation of the shapeable compositions in the final polymer of the present invention, it is preferable that the molecular weight be such that the inherent viscosity of the polymer be at least 0.3, preferably 0.5 to 5.0. The inherent viscosity is measured at 30° C. at a concentration of 0.5% by weight of the polymer in a suitable solvent. The suitable solvent for the purpose of the present invention has been chosen as dimethyl sulfoxide or N,N-dimethylacetamide. The viscosity of the polymer solution is measured relative to that of the solvent alone and the inherent viscosity equals:

$$\frac{\text{natural logarithm } \frac{\text{viscosity of solution}}{\text{viscosity of solvent}}}{C}$$

where C is the concentration expressed in grams of polymer per 100 milliliters of solution. As known in the polymer art, inherent viscosity is directly related to the molecular weight of the polymer.

The starting materials for forming the products of the present invention are a tetra-amine and at least one tetracarboxylic acid dianhydride. Representative dianhydrides from which R stems include:

pyromellitic dianhydride;
2,3,6,7-naphthalane tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphneyl) methane dianhydride;
benzene-1,2,3,4-tetracarboxylic dianhydride;
thiophene-2,3,4,5-tetracarboxylic dianhydride;

decahydronaphthalene-1,2,5,6-tetracarboxylic dianhydride;
butane-1,2,3,4-tetracarboxylic dianhydride;
cyclohexane-1,2,4,5-tetracarboxylic dianhydride;
cyclobutane-1,2,3,4-tetracarboxylic dianhydride;
dimethylcyclobutane-1,2,3,4-tetracarboxylic dianhydride;
tetramethylcyclobutane-1,2,3,4-tetracarboxylic dianhydride;
tricyclo[4,2,2,0$^{2.5}$] dec-7-ene-3,4,9,10-tetracarboxylic, etc.

Examples of tetra-amino compounds from which R′ stems are:

3,3′-diaminobenzidine;
bis(3,4-diamino phenyl) methane;
1,2-bis(3,4-diamino phenyl) ethane;
2,2-bis(3,4-diamino phenyl) propane;
bis(3,4-diamino phenyl) ether;
bis-(3,4-diamino phenyl) sulfide;
bis(3,4-diamino phenyl) sulfone;
3,4,3′,4′-tetra-amino diphenyl;
1,2,4,5-tetra-amino benzene;
2,3,6,7-tetra-amino naphthalene;

etc.; and the corresponding fully ring-hydrogenated tetra-amines.

As mentioned previously, the reaction of any of these tetra-amino compounds with the tetracarboxylic acid dianhydrides can be carried out in an inert solvent to form the linear amino polyamide-acid. This polymeric intermediate can be shaped and after it is in the desired shape, converted into the corresponding polyheterocyclic by heating at a temperature above about 150° C. This conversion can be started if desired in a high boiling solvent such as N,N-dimethylacetamide, and then finished by vigorous heating of the dry polymer. The reaction is aided by a current of inert gas such as nitrogen, or by operating in a vacuum, both of which help to remove the bi-product water. The structural formula of the resulting polyheterocyclic follows:

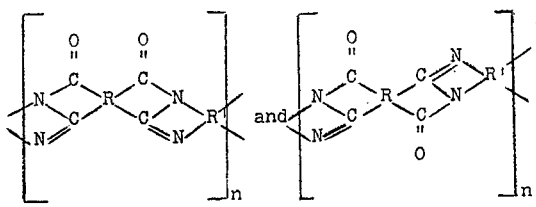

wherein $n$ is an integer sufficient to provide a film-forming polymer;

R is a tetravalent radical containing at least two carbon atoms, substituted with carbon atoms in pairs, the members of each pair being situated 1,2 or 1,3 on carbon atoms of the R group, and ortho or peri when R is aromatic, all of said carbon atoms together with a nitrogen atom attached to R′, forming a 2,5-pyrrolidone or 2,6-piperidone ring, i.e., cyclic imide ring shown above; and R′ is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals, and, together with these carbon atoms and a carbon substituent on the R radical, forming the imidazole or pyrimidine ring shown above.

Hence, a carbon substituent of R and a nitrogen sub-substituent of R′ are members of both heterocyclic rings between R and R′.

Polymers of this invention are characterized by having recurring units comprising fused rings including a bicyclic system selected from the group consisting of 5-keto-pyrrolo[1,2-a]imidazole (A), 5-keto-imidazo[1,2-a]pyridine (B), 6-keto-pyrrolo[1,2-a]pyrimidine (C), 6-keto - pyrido[1,2 - a]pyrimidine (D) and partially hydrogenated derivatives thereof. The partially hydrogenated systems result when either the dianhydride, the tetra-amine, or both, are aliphatic in character.

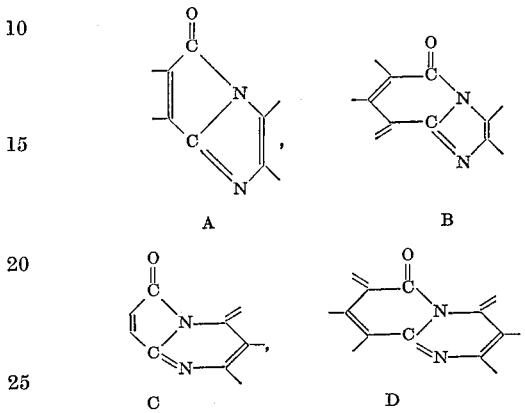

A  B

C  D

The solvents useful in the solution polymerization process for synthesizing the linear amino polyamide-acid compositions of the present invention are the organic solvents whose functional groups do not react with either of the reactants to a greater extent than the reactants do with each other. Besides being inert to the system and, preferably, being a solvent for the product, the organic solvent must be a solvent for at least one of the reactants, preferably for both of the reactants. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polymers and polymeric shaped articles by evaporation, displacement or diffusion. Other typical compounds of this useful class of solvents are: N,N-diethylformamide, N,N-diethylacetamide, N,N-dimethylmethoxy acetamide, N-methylcaprolactam, etc. Other solvents which can be used in the present invention are: dimethyl sulfoxide, N-methyl-2-pyrrolidone, tetramethylene urea, pyridine, dimethyl sulfone, hexamethyl phosphoramide, polyphosphoric acid, tetramethylene sulfone, formamide, N-methylformamide and N-acetyl-2-pyrrolidone. The solvents can be used alone, in combinations of solvents, or in combination with poorer solvents such as benzene, benzonitrile, dioxane, butyrolactone, xylene, toluene and cyclohexane.

This invention will be more clearly understood by referring to the examples which follow. These examples, which illustrate specific embodiments of the present invention, should not be construed to limit the invention in any way.

Example 1

One gram of pyromellitic dianhydride and 0.98 g. of 3,3′-diaminobenzidine are mixed in 15 ml. of nitrobenzene. The intermediate tractable polymer is not isolated in this case. The mixture is refluxed for several hours, and the dark red insoluble solid which is formed is separated by filtration. The product is found to weigh 1.7 g., and it did not melt below 550° C. Its infrared spectrum is found to have a very distinct band in the carbonyl region, consistent with that believed to be characteristic of a fused beta, gamma lactam structure. This confirmed that cyclization has occurred to produce the desired polyheterocyclic made up of bis-benzimidazo[1,2-a:1′,2′-a′]benzo-[1,2-c:4,5-c′]dipyrrole and bis-benzimidazo[1,2-a:1′,2′-a′]benzo[1,2-c:5,4-c′]dipyrrole units.

A similar run at about 150° C. in polyphosphoric acid gives the same polyheterocyclic of 0.5 inherent viscosity (H₂SO₄) and thermal stability up to at least 605° C.

The same reagents in dimethyl sulfoxide at room temperature give intermediate polymer of inherent viscosity 0.6 (in DMSO). On heating this solution gels, producing the cyclized polymer which is soluble in H₂SO₄.

Example 2

Pyromellitic dianhydride (1 g.) is added to a solution of 3,3'-diaminobenzidine (0.98 g.) in about 10 parts of N,N-dimethylacetamide. The last 5% of the dianhydride is added as a solution in the same solvent. Reaction of the reagents to form the intermediate amine substituted polyamide-acid occurs at room temperature to slightly above room temperature. After this polymerization stage, the solution is cast into a film which is reddish orange. This film is dried at 150° C. The heating required to dry it also causes cyclization, so that the intermediate is converted into the insoluble polyheterocyclic of Example 1. The product is very resistant to solvent and chemical attack and useful as a heavy duty polymeric film.

Examples 3–8

When the procedure of Example 2 is repeated using each of the following dianhydrides instead of pyromellitic dianhydride, the corresponding polyheterocyclic film of good quality is produced:

(3) 2,3,6,7-naphthalene tetracarboxylic dianhydride
(4) 3,3',4,4'-diphenyl tetracarboxylic dianhydride
(5) bis(3,4-dicarboxyphenyl) ether dianhydride
(6) bis(3,4-dicarboxyphenyl) sulfone dianhydride
(7) bis(3,4-dicarboxyphenyl) methane dianhydride
(8) 3,3',4,4'-benzophenone tetracarboxylic dianhydride.

Examples 9–16

Substitution of each of the following tetra-amines for diaminobenzidine in the procedure of Example 2 produces the corresponding polyheterocyclic in the form of a good quality film:

(9) bis(3,4-diamino phenyl) methane
(10) 1,2-bis(3,4-diamino phenyl) ethane
(11) 2,2-bis(3,4-diamino phenyl) propane
(12) bis(3,4-diamino phenyl) ether
(13) bis(3,4-diamino phenyl) sulfide
(14) bis(3,4-diamino phenyl) sulfone
(15) 1,2,4,5-tetraamino benzene
(16) 2,3,6,7-tetraamino naphthalene.

Example 17

To 6.42 g. of 3,3'-diaminobenzidene in 45 ml. of dry dimethyl sulfoxide is added through a 50-ml. hypodermic syringe with a No. 20 needle, over a 2-hour period with rapid stirring, a solution of 5.89 g. of pyromellitic dianhydride in 45 ml. of dry dimethyl sulfoxide. To the resulting viscous solution is added, with stirring, another 0.65 g. of pyromellitic dianhydride in 11 ml. dimethyl sulfoxide through a 20-ml. hypodermic syringe with a No. 24 needle over a 2-hour period. An aliquot of the resulting solution, on dilution with dimethyl sulfoxide such that the concentration of polymer and solution is 0.5 g. per 100 ml. of solution, gives an inherent viscosity of 0.92. Films of this solution of less than 1 mil in thickness are heated and examined by infrared. Their spectra are consistent with that for the polyheterocyclic structure of the product, which is the same as that given in Example 1.

The above experiment is carried out eight times, and the combined reaction mixtures are concentrated at 40–45° C. under less than 1 mm. pressure, until the concentration of solids is about 25%. This solution is heated to 55° C., then passed through an adapter at 85–100° C., and dry spun through a spinneret of 0.005 inch diameter under 1100–1200 p.s.i. into a column whose temperature is 215–225° C. with a sweep of 255° C. nitrogen at 4 cu. ft./min. The wind-up speed is 90 yd. per minute.

The resulting fibers are drawn 1.2× at 283° C. followed by 1.2× at 500° C., and then relaxed at 350° C. for 15 minutes. The resulting fibers have the following properties:

|  | Tenacity (g./denier) | Elongation (percent) | Modulus (g./denier) |
| --- | --- | --- | --- |
| Straight | 3.7 | 21 | 82 |
| Knot | 1.7 | 12 | 60 |
| Loop | 1.3 | 4.6 |  |

These fibers show no change in properties on exposure overnight to (1) 10% NaOH solutions at 85–95° C. or (2) air at 400° C.

Example 18

To a solution of 6.42 g. (0.03 mole) of 3,3'-diaminobenzidine in 30 ml. of dimethylsulfoxide is added, with stirring, a solution of 8.22 g. (0.03 mole) of tricyclo-[4,2,2,0²·⁵]dec-7-ene-3,4,9,10-tetracarboxylic dianhydride,

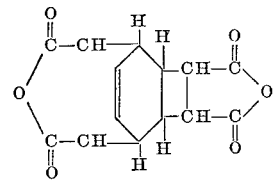

in 100 ml. of dimethylsulfoxide. Films are cast from this mixture and are dried at 100° C. After further heating at 300° C., the infrared spectra of these films supported a structure containing a partially hydrogenate 5-keto-pyrrolo [1,2-a]imidazole system corresponding to structure A above.

Example 19

To a solution of 2.07 g. (0.015 mole) of 1,2,4,5-tetraaminobenzene in 30 ml. of dimethylsulfoxide is added, with stirring, a solution of 4.11 g. (0.015 mole) of tricyclo [4,2,2,0²·⁵]dec-7-ene-3,4,9,10-tetracarboxylic dianhydride in 100 ml. of dimethylsulfoxide. Films cast from this mixture and are dried at 100° C. After further heating at 350° C., the infrared spectra of films supported a structure containing a partially hydrogenated 5-keto-pyrrolo[1,2-a]-imidazole system corresponding to structure A above.

What is claimed is:
1. A polymer consisting essentially of the recurring structural formula:

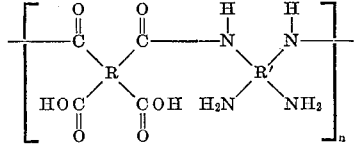

wherein R is a tetravalent radical containing at least two carbon atoms, substituted with carbon atoms in pairs, the members of each pair being situated 1,2 or 1,3 on carbon atoms of the R group, and ortha or peri when R is aromatic;

R' is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals;

→denotes isomerism; and $n$ is an integer sufficient to provide an inherent viscosity of at least 0.1 when measured at 30° C. as a 0.5% by weight solution in dimethyl sulfoxide.

2. The polymer of claim 1 wherein R' is a tetravalent radical selected from the group consisting of carbocyclic aromatic radicals and carbocyclic aromatic radicals bridged by a radical selected from the group of alkylene of 1 to 3 carbon atoms, oxygen, sulfur and sulfone.

3. The polymer of claim 2 wherein R is a tetravalent aromatic radical, substituted with carbon atoms in pairs, the members of each pair being on ortho or peri carbon atoms of said tetravalent aromatic radical.

4. A shapeable composition composed of the polymer of claim 1 in a solvent therefor.

5. The polymer of claim 1 in the form of a self-supporting film.

6. The polymer of claim 3 wherein R is a tetravalent benzene radical and R' is a tetravalent biphenyl radical.

7. A polymer consisting essentially of the recurring structural formulas of the class:

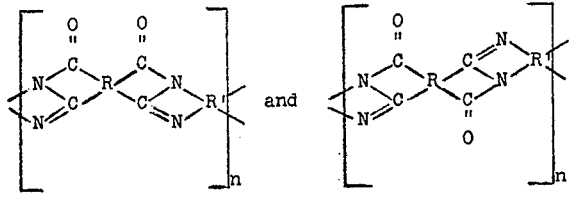

wherein R is a tetravalent radical containing at least two carbon atoms, substituted with carbon atoms in pairs, the members of each pair being situated 1,2 or 1,3 on carbon atoms of the R group, and ortho or peri when R is aromatic;

R' is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, said tetravalent radicals being substituted with nitrogen atoms in pairs, the members of each pair being on ortho or peri carbon atoms of said tetravalent radicals; and n is an integer sufficient to provide an inherent viscosity of at least 0.3 when measured at 30° C. as a 0.5% by weight solution in sulfuric acid.

8. The polymer of claim 7 wherein R' is a tetravalent radical selected from the group consisting of carbocyclic aromatic radicals and carbocyclic aromatic radicals bridged by a radical selected from the group of alkylene of 1 to 3 carbon atoms, oxygen, sulfur and sulfone.

9. The polymer of claim 8 wherein R is a tetravalent aromatic radical, substituted with carbon atoms in pairs, the members of each pair being on ortho or peri carbon atoms of said tetravalent aromatic radical.

10. The polymer of claim 7 in the form of a self-supporting film.

11. The polymer of claim 7 in the form of a fiber.

12. The polymer of claim 9 wherein R is a tetravalent benzene radical and R' is a tetravalent biphenyl radical.

13. A process for preparing a shapeable polymeric composition which comprises reacting substantially equimolar quantities of at least one tetra-amine having the structural formula:

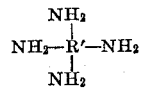

wherein R' is a tetravalent radical selected from the group consisting of carbocyclic aromatic and paraffinic radicals and carbocyclic aromatic and paraffinic radicals bridged by a radical selected from the group of alkylene of 1 to 3 carbon atoms, oxygen, sulfur and sulfone, each amino group of said tetra-amine attached directly to a carbon atom of a ring of said tetravalent radicals ortho or peri to the carbon atoms to which another amine group is directly attached, with at least one tetracarboxylic acid dianhydride having the structural formula:

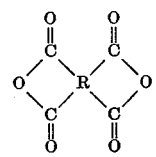

wherein R is a tetravalent radical containing at least two carbon atoms, substituted with carbon atoms in pairs, the members of each pair being situated 1,2 or 1,3 on carbon atoms of the R group, and ortho or peri when R is aromatic, in an organic solvent for at least one reactant, said solvent being inert to the system, while maintaining the temperature throughout the reaction below about 125° C.

14. The process of claim 13 wherein said shapeable polymeric composition is shaped into a self-supporting film.

15. The process of claim 13 wherein the polymeric composition is shaped into a shaped article; said article is heated at a temperature of at least 150° C. for a time sufficient to convert the polymeric composition of said article to the polymer of claim 7.

References Cited

UNITED STATES PATENTS

| | | | |
|---|---|---|---|
| 2,502,548 | 4/1950 | Allen et al. | 260—78 |
| 2,615,863 | 10/1952 | Flory | 260—78 |
| 2,895,948 | 7/1959 | Brinker et al. | 260—78 |
| 3,174,947 | 3/1965 | Marvel et al. | 260—78.4 |

WILLIAM H. SHORT, *Primary Examiner.*

L. LEE, *Assistant Examiner.*